United States Patent Office 3,824,222
Patented July 16, 1974

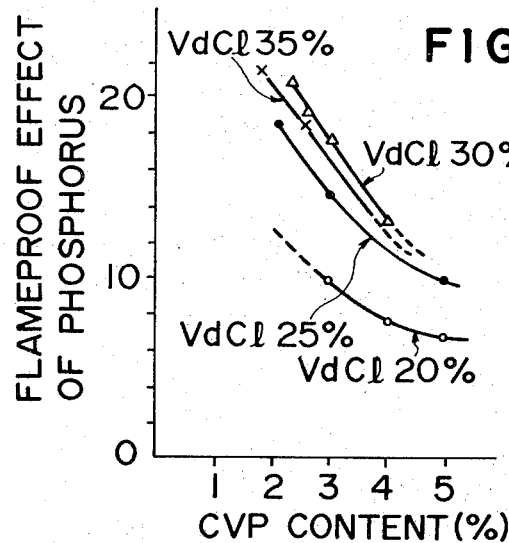
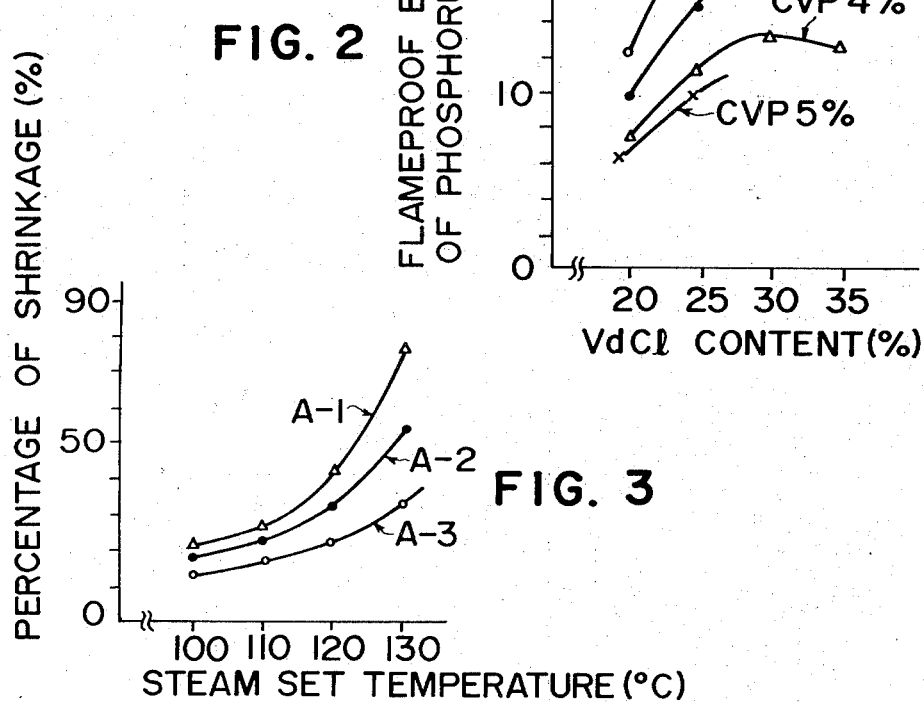

3,824,222
FLAMEPROOF MODACRYLIC FIBERS
Yoshihisa Shichijo, Hideo Sato, Toshio Iwasa, and Yasuo Uchida, Fuji, Japan, assignors to Asahi Kasei Kogyo Kabushiki Kaisha
Filed Nov. 5, 1971, Ser. No. 196,100
Claims priority, application Japan, Nov. 5, 1970, 45/96,831
Int. Cl. C08f 15/40
U.S. Cl. 260—80.71    7 Claims

ABSTRACT OF THE DISCLOSURE

Modacrylic fibers having excellent flameproof property and retaining the superior whiteness, heat-stability, etc. of acrylonitrile polymer fibers are produced from the polymers containing, as principal components, 50% by weight or more of acrylonitrile, 25% by weight or more of vinylidene chloride and 0.1–3% by weight of bis(2-chloroethyl)vinylphosphonate, and if necessary, as additional component, at least one copolymerizable ethylenically unsaturated compound.

---

Figure 4:
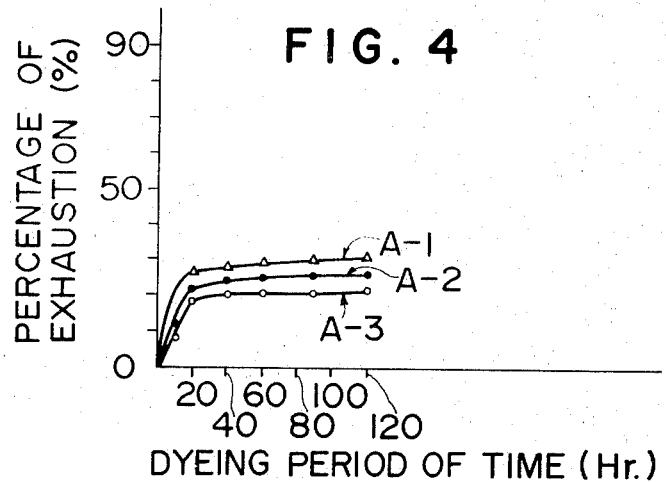

This invention relates to novel flameproof modacrylic fibers. More particularly it relates to novel flameproof modacrylic fibers prepared from 50% by weight or more of acrylonitrile, 25% by weight or more of vinylidene chloride and 0.1–3% by weight of bis(2-chloroethyl) vinylphosphonate as principal components, and at least one copolymerizable ethylenically unsaturated compound as additional component, if necessary.

Attempts to give fibers flameproof property have been made heretofore by various ways. For example, there are methods in which an organic halogen compound, an organic halogen-containing phosphorous compound, an inorganic substance such as antimony oxide, boric acid, or the like is incorporated in or attached on fibers as a flameproof agent. However, in these methods, a large amount of the above-mentioned substance must be incorporated in order to give sufficient flameproof property. This often gives undesirable influence upon the properties, handle, dyeability, etc. Furthermore, even when it is incorporated with great pains, it often comes off during the time of after-treatment such as dyeing, scouring, etc., and hence there remains the problem of durability of flameproof property.

On the other hand, as a method for affording a durable flameproof property, copolymerization of acrylonitrile with a halogen-containing vinyl monomer e.g. vinyl chloride or vinylidene chloride, has been carried out. In this case, the object can be attained by using a large amount of monomer but it is said that incorporation of more than 30% by weight of chlorine into a polymer is necessary in order to obtain satisfactory flameproof grade in general. For this purpose, incorporation of about 53% by weight or more of vinyl chloride or about 41% by weight or more of vinylidene chloride is necessary. Further, depending upon a spinning solvent used, it is often attempted to incorporate vinyl chloride or vinylidene chloride in an amount more than that in order to increase solubility.

Modacrylic fibers of vinyl chloride-acrylonitrile copolymer improves flameproof properties a great deal but resultant fibers have a lower sticking point, and show a large shrinkage at a higher temperature, hence they are not suitable to most of the utility in spinning and weaving field. For example, when 20–40% by weight of vinyl chloride is copolymerized with acrylonitrile, flameproof property is greatly elevated but its sticking point becomes lower than 150° C. and a considerable shrinkage occurs in boiling water. In contrast, the sticking point of acrylonitrile polymer synthetic fibers is 200° C. and shows shrinkage of only 5% in water. Accordingly, modacrylic fibers of vinyl chloride-acrylonitrile copolymer are used only in the field where the most flameproof property is required, e.g. carpet, curtain, etc.

On the other hand, modacrylic fibers of vinylidene chloride-acrylonitrile copolymer have superior heat-resistance. Compared with polyacrylonitrile, incorporation of 7% by weight of vinylidene chloride elevates the second order transition point of polyacrylonitrile from 87° C. to 110° C. and incorporation of 30% by weight of vinylidene chloride elevates it to 135° C. The higher the second order transition point, the higher the resistance to deformation caused by an outer force at a higher temperature. On the other hand, the dyeing becomes much difficult and the fastness of dyed products becomes lower with the increase of the second order transition point. Moreover modacrylic fibers of vinylidene chloride-acrylonitrile copolymer are inferior in light-fastness and their utilities are limited on this account.

We have paid our attention to the facts that (1) in order to give sufficient flameproof property to modacrylic fibers of vinylidene chloride-acrylonitrile copolymer, copolymerization with 41% by weight or more of vinylidene chloride would be sufficient, and (2) with the increase of the acrylonitrile content of polymer in modacrylic fibers, properties become closer to acrylonitrile polymer synthetic fibers and most properties such as dyeability, resistance to thermal decomposition, light-fastness, etc. are improved, and have repeated the study on the production of vinylidene chloride type synthetic fibers containing 50% by weight or more of acrylonitrile. In this case, however, an inexpensive readily available solvent such as acetone cannot be used and a special solvent such as dimethyl formamide must be used. This has become a difficult point.

However, we have found that superior flameproof modacrylic fibers whose whiteness, heat-stability, etc. are not inferior to acrylonitrile polymer fibers can be produced by preparing a polymer having a uniform distribution of composition by way of a continuous emulsion polymerization, a continuous suspension polymerization, a solution polymerization, etc., dissolving it in a concentrated aqueous solution of nitric acid to prepare a transparent colorless spinning solution, and extruding the spinning solution into a coagulation bath of an aqueous solution of nitric acid, followed by stretching and drying.

However, the fibers comprising acrylonitrile (AN)-vinylidene chloride (VdCl)-copolymer containing 40–45% by weight of vinylidene chloride are less thermally-shrinkable, inferior in dyeability and dying-fastness and require the use of a nitric acid having a concentration considerably higher than that of the azeotropic mixture of nitric acid and water in dissolving as evident from Table 1.

TABLE 1

| Composition of AN-VdCl copolymer (percent by weight) | | Minimum concentration of nitric acid capable of dissolving the copolymer (percent) [1] |
|---|---|---|
| 50 | 50 | 82 |
| 55 | 45 | 80 |
| 60 | 40 | 78 |
| 65 | 35 | 73 |
| 70 | 30 | 67 |
| 75 | 25 | 65 |

[1] 1 g. copolymer/10 cc. nitric acid at 20° C.

Accordingly, there is a drawback in the point that a large amount of concentrated nitric acid is required for the control of solvent which is extremely expensive.

After our strenuous study for solving the above-mentioned drawbacks, we have found that even a small content of vinylidene chloride can give sufficient flameproof properties and completed the present invention.

Namely fibers having superior flameproof property have been obtained by copolymerizing about 0.1 to 3% by weght of a phosphorus-containing monomer having a general formula of

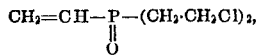

bis(2-chloroethyl) vinylphosphonate (which will be hereinafter abbreviated to CVP), with acrylonitrile and vinylidene chloride.

The CVP monomer, when it is solely incorporated in acrylonitrile and copolymerized therewith in an amount of 20 to 40% by weight, the flameproof property of the resultant fibers is insufficient but when it is incorporated simultaneously with vinylidene chloride in acrylonitrile and copolymerized therewith, extremely superior flameproof property can be realized.

It is believed that this is due to the synergistic effect of chlorine atom and phosphorus atom in a polymer and it has been confirmed that this synergistic effect of CVP monomer and VdCl monomer is particularly pronounced when the content of VdCl monomer is 25% by weight or more and that of CVP monomer is about 2-3% by weight.

Now the experimental results of flameproof properties of modacrylic fibers of acrylonitrile-vinylidene chloride-copolymer and of acrylonitrile-vinylidene chloride-CVP-copolymer are shown in Tables 2 and 3.

In these experiments, the measurements were carried out according to a following procedure (JIS 45° coil process):

(i) As specimens, yarns of 15 cm. length and 2 g. weight were used.

(ii) A position of flame was fixed and specimens were allowed to contact with the flame until burning started (period time of contact with flame). When the burning started, the flame was removed and the duration time of remaining flame was determined (duration time of remaining flame).

(iii) When the fire was self-extinguished on the way, the flame was again contacted with the lower end of the specimen and the same procedure was continued (Number of times of contact with flame).

(iv) The same procedures were repeated until the specimen was completely burnt down to nothing. The number of times of contact with flame was recorded.

The standards of evaluation are as follows:

(i) Period of time of contact with flame: the longer the period of time of contact with flame, the more difficult to catch fire.

(ii) Duration time of remaining flame and number of times of contact with flame: the greater the number of times of contact with flame and the shorter the duration time of remaining flame, the better the flameproof property, while the smaller the number of times of contact with flame and the longer the duration time of remaining flame, the worse the flameproof property.

To catch fire easily and to be fast in burning speed mean that self-extinction is difficult. When the number of times of contact with flame is small and the duration time of remaining flame is longer, the specimen is slow in burning speed and difficult to be self-extinguished. When the number of times of contact with flame is large and the duration time of remaining flame is longer, the flame does not shift and the specimen is self-extinguished. In such a case, burning speed is slow and the specimen burns slowly at one spot.

TABLE 2

[Flameproof properties of modacrylic fibers of AN-VdCl copolymer]

| Specimen No. | Copolymer composition (percent by weight) | | Chlorine content of copolymer (percent by weight) | Period of time of contact with flame (sec.) | Duration time of remaining flame (sec.) | Number of times of contact with flame |
| --- | --- | --- | --- | --- | --- | --- |
| | AN | VdCl | | | | |
| 1 | 54.8 | 45.2 | 33.1 | 9.5 | 1.0 | 15 |
| 2 | 59.8 | 40.2 | 29.4 | 7.3 | 3.0 | 10 |
| 3 | 66.2 | 33.8 | 24.7 | 5.0 | 9.8 | 9 |
| 4 | 69.3 | 30.7 | 22.5 | 5.8 | 34.0 | 5 |
| 5 | 75.0 | 25.0 | 18.3 | 4.0 | 185.0 | 1 |
| 6 | 100.0 | | | 3.0 | 84.0 | 1 |

TABLE 3

[Flameproof properties of modacrylic fibers of AN-CVP-copolymer and of AN-VdCl-CVP-copolymer]

| Specimen No. | Copolymer composition (percent by weight) | | In copolymer | | Period of time of contact with flame (sec.) | Duration time of remaining flame (sec.) | Number of times of contact with flame |
| --- | --- | --- | --- | --- | --- | --- | --- |
| | VdCl | CVP | Cl content, percent | P content, percent | | | |
| 7 | | 19.2 | 5.9 | 2.6 | 6.0 | 32.0 | 3 |
| 8 | | 25.6 | 7.8 | 3.4 | 6.5 | 27.0 | 4 |
| 9 | | 33.0 | 10.1 | 4.4 | 7.3 | 21.0 | 6 |
| 10 | 5.5 | 26.0 | 11.9 | 3.5 | 7.0 | 10.2 | 8 |
| 11 | 4.9 | 29.8 | 12.7 | 4.0 | 8.1 | 7.3 | 10 |
| 12 | 20.4 | 3.1 | 15.8 | 0.41 | 4.1 | 85.0 | 3 |
| 13 | 19.8 | 4.0 | 15.7 | 0.53 | 5.0 | 60.5 | 4 |
| 14 | 20.6 | 5.1 | 16.7 | 0.68 | 4.7 | 37.0 | 4 |
| 15 | 25.2 | 2.1 | 19.0 | 0.28 | 4.1 | 11.2 | 7 |
| 16 | 24.9 | 3.0 | 19.1 | 0.40 | 5.0 | 9.9 | 9 |
| 17 | 24.3 | 3.6 | 18.9 | 0.48 | 5.2 | 7.3 | 9 |
| 18 | 25.0 | 5.0 | 19.8 | 0.67 | 5.3 | 5.1 | 10 |
| 19 | 30.2 | 2.3 | 22.8 | 0.31 | 5.0 | 3.0 | 11 |
| 20 | 30.6 | 2.5 | 23.2 | 0.33 | 4.6 | 3.1 | 11 |
| 21 | 29.8 | 3.1 | 22.7 | 0.41 | 5.1 | 2.8 | 12 |
| 22 | 30.9 | 4.0 | 23.8 | 0.53 | 8.0 | 2.7 | 12 |
| 23 | 35.1 | 1.2 | 26.1 | 0.16 | 7.0 | 2.9 | 12 |
| 24 | 35.0 | 2.6 | 26.4 | 0.35 | 9.5 | 2.0 | 14 |
| 25 | 34.8 | 3.1 | 26.4 | 0.41 | 11.2 | 1.0 | 15 |
| 26 | 35.2 | 4.0 | 27.0 | 0.53 | 15.7 | <1.0 | 18 |

In order to compare the flameproof effect of CVP, it was inferred to what kinds of modacrylic fibers of AN-VdCl copolymer, each of modacrylic fibers of AN-VdCl-CVP copolymer corresponds in their flameproof effect, and the results are summarized in Table 4.

This inference was carried out by investigating which composition of two component fibers consisting of AN-VdCl copolymer in Table 2, a given composition of the three component fibers consisting of AN-VdCl-CVP copolymer shown in Table 3 is close to. Namely for example, according to Table 3, the period of time of contact with flame, duration time of remaining flame and number of times of contact with flame of No. 15 are respectively, 4.1, 11.2 and 7. Whereas according to Table 2, the period of time of contact with flame, duration time of remaining flame and number of time of contact with flame of No. 3 (VdCl content: 33.8%) are respectively 5.0, 9.8 and 9 and those of No. 4 (VdCl content: 30.7%) are respectively 5.8, 34.0 and 5. Thus the flameproof property of No. 15 (three component fibers) is thus inferred to correspond to that of the two component fibers whose VdCl content is 33%. Similarly the flameproof property of No. 19 (three component fibers) is inferred to correspond to that of the two component fibers whose VdCl content is 40%, and the flameproof property of No. 22 (three component fibers) is inferred to that of the two component fibers whose VdCl content is 42%. By the similar procedure, the compositions of corresponding AN-VdCl synthetic fibers were determined and results are shown in Table 4.

Next, the flameproof effects of phosphorus in contrast to chlorine were expressed by $$\frac{A-C}{B},$$

as seen in Table 4, wherein A is a Cl content of AN-VdCl-CVP fibers (percent); B is a P content of AN-VdCl-CVP fibers (percent); and C is a Cl content of AN-VdCl fibers (percent).

amount of 30% by weight, sufficient flameproof property cannot be given. However, when it exists together with VdCl, its effect becomes synergistic, the most pronounced effect can be obtained particularly when 25% by weight or more of VdCl and 3% by weight or less of CVP are existent, and incorporation of CVP monomer over the above-mentioned value is not preferable because it does not increase the effect but on the other hand causes cohesion of filaments due to heat. Further when the content of VdCl is less than 25% by weight, sufficient flameproof property cannot be obtained even when CVP monomer is copolymerized.

In respect of the flameproof property and the synergistic property obtained by the combination of chlorine with phosphorus, it is preferable that the content of VdCl is in the range of 25–40% by weight. Further, it is possible to increase the flameproof property by increasing the content of VdCl. The increase of the VdCl content over 40% by weight is, however, not preferable because the heat-shrinking property and dyeability are reduced as in the case of two component system consisting of AN and VdCl, and minimum concentration of nitric acid capable of dissolving polymers becomes larger.

The above-mentioned AN-VdCl-CVP copolymer gives fibers having superior flameproof property but resultant fibers are inferior somewhat in dyeability and brittle somewhat in the fiber nature. On this account, incorporation of a copolymerizable ethylenically unsaturated compound in an amount of 10% or less or preferably 2–5%, is advantageous. Further it is advantageous to incorporate 1% or less, or preferably 0.1 to 0.5% of another copolymerizable ethylenically unsaturated compound having a dye site for a basic dye in order to increase its dyeability.

The former copolymerizable ethylenically unsaturated compound referred to herein include acrylic acid, methacrylic acid, methyl acrylate, ethyl acrylate, methyl methacrylate, acrylamide, methacrylamide, vinyl acetate.

It is preferable to use as the latter compound having a dye site, vinylsulfonic acid, styrenesulfonic acid, allyl-

TABLE 4

[Compairson of flameproof properties of AN-VdCl-CVP modacrylic fibers with those of AN-VdCl modacrylic fibers]

| Specimen No. | Composition of AN-VdCl-CVP synthetic fibers | | | | Composition of corresponding AN-VdCl | | Flameproof effect of P in contrast to (C−A) / B |
|---|---|---|---|---|---|---|---|
| | VdCl (percent by weight) | CVP (percent by weight) | Cl content (A percent) | P content (B percent) | VdCl (percent by weight) | Cl content (C percent) | B |
| 10 | 5.5 | 26.0 | 11.9 | 3.5 | 32 | 23.4 | 3.3 |
| 11 | 4.9 | 29.8 | 12.7 | 4.0 | 40 | 29.3 | 4.2 |
| 12 | 20.4 | 3.1 | 15.8 | 0.41 | 27 | 19.8 | 9.8 |
| 13 | 19.8 | 4.0 | 15.7 | 0.53 | 27 | 19.8 | 7.7 |
| 14 | 20.6 | 5.1 | 16.7 | 0.68 | 29 | 21.2 | 6.6 |
| 15 | 25.2 | 2.1 | 19.0 | 0.28 | 33 | 24.2 | 18.4 |
| 16 | 24.9 | 3.0 | 19.1 | 0.40 | 34 | 24.9 | 14.5 |
| 17 | 24.3 | 3.6 | 18.9 | 0.48 | 35 | 25.6 | 14.0 |
| 18 | 25.0 | 5.0 | 19.8 | 0.67 | 36 | 26.4 | 9.8 |
| 19 | 30.2 | 2.3 | 22.8 | 0.31 | 40 | 29.3 | 21.0 |
| 20 | 30.6 | 2.5 | 23.2 | 0.33 | 40 | 29.3 | 18.5 |
| 21 | 29.8 | 3.1 | 22.7 | 0.41 | 41–42 | 30.0–30.7 | 17.8–19.5 |
| 22 | 30.9 | 4.0 | 23.8 | 0.53 | 42 | 30.7 | 13.0 |
| 23 | 35.1 | 1.8 | 26.3 | 0.24 | 43 | 31.5 | 21.7 |
| 24 | 35.0 | 2.6 | 26.4 | 0.45 | 45 | 32.9 | 18.6 |
| 25 | 34.8 | 3.1 | 26.4 | 0.41 | >45 | >32.9 | >15.9 |
| 26 | 35.2 | 4.0 | 27.0 | 0.53 | >45 | >32.9 | >11.1 |

From the comparison of the values of flameproof effect $$\left(\frac{C-A}{B}\right)$$

in Table 4, it can be seen that a synergistic effect between phosphorus and chlorine is obtained by further adding a small amount of CVP.

The flameproof effect of phosphorus of modacrylic fibers of AN-VdCl-CVP copolymer are plotted against CVP content and also against VdCl content in FIG. 1 and FIG. 2, respectively.

From Tables 3 and 4 and FIG. 1, it can be seen that the flameproof effect of the phosphorus in CVP alone is extremely weak, and even when it is copolymerized in an sulfonic acid, methallylsulfonic acid, or sodium, potassium or ammonium salts thereof.

The copolymer having a composition of the present invention can be readily prepared by using a well known redox catalyst such as potassium persulfate, sodium bisulfite, or the like by way of a solution-, emulsion- or suspension-polymerization manner.

With regard to polymerization type, any of batch process, semi-continuous process and continuous process can be used but in order to obtain superior fibers having uniform distributions of composition and polymerization degree, a continuous emulsion polymerization process of perfect mixing type is most preferable where monomers, water, an emulsifier, a catalyzer, etc. are continuously added to the inside of a polymerization vessel and resultant polymers are continuously taken out as a latex.

According to a conventional process, it is possible to obtain a polymer. Namely, for example, a composition consisting of 100 parts by weight of monomers, 400–500 parts by weight of water, 1.0–2.0 parts by weight of an emulsifier, 0.2–1.0 parts by weight of potassium persulfate and 0.2–4.0 parts by weight of sodium bisulfite was continuously charged to a polymerization vessel and polymerized at a temperature of 10–30° C. for a retention time of 3 to 15 hours. Resultant polymer in latex form was continuously taken out and subjected to salting-out, water washing and drying to obtain polymer.

In the production of the synthetic fibers of the composition of the present invention, dimethyl formamide or concentrated nitric acid can be used. However, dimethyl formamide has disadvantage in the point that it is expensive, not easily available, liable to color polymers by the decomposition during the operation, and its recovery is not easy due to its high boiling point. On this account, fibers are produced by using a concentrated nitric acid, as a solvent.

Thus a copolymer containing 50% by weight or more, with water is in the range of 66.3–66.5%, and hence such a concentration is necessary to be elevated. Moreover, the higher the concentration of nitric acid, the more difficult the removal of nitrous acid. On this account, the use of higher concentrated nitric acid is not preferable because polymers are liable to undergo degradation and become a cause of relatively wide fluctuation of properties of products.

The present invention is further illustrated by the following non-limitative examples.

EXAMPLE 1

A copolymer of AN-VdCl-CVP having following compositions was continuously charged to a 10 l. three neck flask from one side under such condition that water ratio was 1:5, sodium lauryl sulfate was 1.0% by weight relative to monomer, catalyst was potassium persulfate (KPS) and sodium bisulfite (SBS), pH was 2.5, temperature was 25° C. and a mean retention time was 4 hours, and polymer latex was taken out from the other side. After salting out with calcium chloride, resultant polymer was filtered, dehydrated, washed with water and dried to obtain polymers as shown in Table 6.

TABLE 6

| Copolymer No. | Composition of monomer charged, (percent) | | | Catalyst composition percent relative to monomer | | Copolymer composition (percent by weight) | | | Percentage of polymerization (percent) | DM[1] | Minimum concentration of nitric acid capable of dissolving copolymer (percent)[2] |
|---|---|---|---|---|---|---|---|---|---|---|---|
| | AN | VdCl | CVP | KPS | SBS | AN | VdCl | CVP | | | |
| A-1 | 61 | 35 | 4 | 0.75 | 1.65 | 61.8 | 35.2 | 3.0 | 74.2 | 1,327 | 74 |
| A-2 | 66 | 30 | 4 | 0.75 | 2.10 | 66.1 | 3.09 | 3.0 | 52.0 | 1,585 | 69 |
| A-3 | 71 | 25 | 4 | 0.75 | 3.20 | 70.7 | 26.5 | 2.8 | 59.8 | 1,669 | 67 |

[1] $DM = \eta_{red} \times 1,000 = \frac{\eta_{sp}}{C} \times 1,000 = \frac{\eta_r - 1}{C} \times 1,000$, solvent: dimethyl formamide.

[2] See footnote 1 at end of Table 1.

of AN, 25% by weight or more of VdCl, 3% by weight or less of CVP obtained according to the above-mentioned various processes, is dissolved in an aqueous solution of a concentrated nitric acid at a temperature of 0° C. or less to give a transparent colorless spinning solution having a viscosity of about 800–1000 poises at 0° C. which is extruded into a coagulation bath of nitric acid having about a half of the concentration of the solvent nitric acid to coagulate into filaments. Resultant filaments are washed with water, stretched by using a boiling water bath at 100° C., a steam of atmospheric pressure or a steam of high pressure, and dried at a temperature higher than 90° C. to obtain transparent, lustrous fibers.

The minimum concentrations of nitric acid capable of dissolving AN-VdCl-CVP copolymer of the present invention are shown in Table 5.

TABLE 5

| Composition of copolymer (percent by weight) | | | | Minimum concentration of nitric acid capable of dissolving copolymer (percent)[1] |
|---|---|---|---|---|
| AN | VdCl | CVP | Other monomer(s) | |
| 68.5 | 25 | 3.0 | 3.5 | 65 |
| 66.2 | 28 | 2.8 | 3.0 | 67 |
| 64.0 | 32 | 2.5 | 1.5 | 70 |
| 58.0 | 34 | 3.0 | 5.0 | 71 |
| 57.8 | 36 | 2.8 | 3.5 | 73 |

[1] See footnote 1 at end of Table 1.

Thus it is possible to select the concentration of nitric acid according to the composition of polymer (mainly content of VdCl) but it is preferable to use as low a concentration of nitric acid as possible in the range of 65–90%, preferably 70–85%, depending upon the solubility of polymer.

In general, a nitric acid having a concentration of more than 90% is not preferable because in addition to the problem regarding the material of production apparatus, the cost of solvent becomes expensive due to the high cost for concentrating nitric acid since the concentration of nitric acid in the azeotropic mixture thereof Resultant polymer was dissolved in a concentrated nitric acid to prepare a spinning solution which was extruded from nozzles having 50 holes of 0.12 mm. diameter into a dilute nitric acid to coagulate into filaments. Resultant filaments were washed with water, and stretched by 7 times by a steam at 100° C. After oiling, they were dried under tension through a hot air cylinder having a length of 3 m. at 120° C. and wound up on a pirn with a take-up speed of 35 m./min. whereby transparent yarns were obtained. Spinning conditions for each run are shown in Table 7 and various physical properties of resultant fibers are shown in Tables 8 and 9 and FIGS. 3 and 4.

FIG. 3 shows a graph in which the percentages of shrinkage of AN-VdCl-CVP fibers are plotted against steam set temperatures. FIG. 4 shows a graph in which the dyeabilities (percentages of exhaustion) of AN-VdCl-CVP fibers are plotted against dyeing periods of time.

Dyeing conditions for each run were as follows:

Untreated fibers:
    Ceblon Green B: 15% OWF (Trademark of a dye made by Du Pont Co., USA)
    Emal 10: 2% OWF (Trademark of an anionic surfactant made by Kao Soap Co., Japan)
    Scourol 400: 1% OWF (Trademark of a nonionic surfactant made by Kao Soap Co., Japan)
Liquor ratio: 1.40
Temperature: 100° C.

TABLE 7

| Copolymer No. | Nitric acid concentration for spinning solution (percent) | Amount of copolymer charged[1] | Viscosity of spinning solution at 0° C. poises | Nitric acid concentration for coagulating solution (percent) |
|---|---|---|---|---|
| A-1 | 80 | 24.5 | 1,000 | 41 |
| A-2 | 75 | 22.5 | 900 | 37 |
| A-3 | 73 | 19.0 | 960 | 35 |

[1] G./100 cc. nitric acid

TABLE 8

| Copolymer No. | Denier | Dry tenacity (g./d.) | Dry elongation (percent) | Wet tenacity (g./d.) | Wet elongation (percent) | Loop tenacity (g./d.) | Loop elongation (percent) |
|---|---|---|---|---|---|---|---|
| A-1 | 6.1 | 3.46 | 12.2 | 3.43 | 14.1 | 0.57 | 6.14 |
| A-2 | 5.9 | 4.09 | 13.7 | 4.07 | 12.6 | 0.80 | 7.27 |
| A-3 | 5.8 | 4.15 | 12.7 | 4.12 | 13.2 | 0.92 | 7.40 |

TABLE 9
[Flameproof properties]

| Copolymer No. | In copolymers Cl content (percent) | In copolymers P content (percent) | Period of time of contact with flame (sec.) | Duration time of remaining flame (sec.) | Number of times of contact with flame |
|---|---|---|---|---|---|
| A-1 | 26.7 | 0.40 | 12.2 | 1.0 | 17 |
| A-2 | 23.5 | 0.40 | 7.1 | 2.6 | 14 |
| A-3 | 20.3 | 0.37 | 6.0 | 9.0 | 10 |

From the foregoing data, the fibers having compositions of A-1, A-2 and A-3, etc. are superior in flameproof property etc., but as seen from FIG. 4, their dyeability looks somewhat inferior.

EXAMPLE 2

Monomers of AN, VdCl, CVP, methyl acrylate (MA) and sodium methallylsulfonate having compositions shown in following Table 10, were respectively copolymerized under following conditions: Monomer to water ratio, 1:5; emulsifier, sodium lauryl sulfate, 1.2% relative to monomer; catalyst, KPS-SBS; pH, 2.5; temperature, 25° C.; and mean retention time, 6 hours.

At first 0.4% aqueous solution of sodium lauryl sulfate was at a rate of 7.0 g./min., and monomers were at a rate of 5.6 g./min., respectively fed into a one l. flask continuously where the mixture was stirred vigorously to emulsify the monomers. Then the resultant monomer emulsion, 0.52% aqueous solution of KPS, 1.6% aqueous solution of SBS and 0.128% aqueous solution of sulfuric acid were charged continuously into a 10 l. flask each at a rate of 7.0 g./min. and polymerization was carried out. During that time, a polymer latex was taken out from the other side and subjected to salting out. After the steps of filtration, dehydration, washing with water, and drying, polymers shown in Table 10 were obtained.

TABLE 11

| Copolymer No. | Nitric acid concentration for spinning solution (percent) | Amount of copolymer charged [1] | Viscosity of spining solution at 0° C. (poises) | Nitric acid concentration for coagulating bath (percent) |
|---|---|---|---|---|
| A-4 | 80 | 24.0 | 980 | 40 |
| A-5 | 75 | 25.0 | 780 | 37 |
| A-6 | 72 | 26.5 | 830 | 35 |

[1] See footnote 1 at end of Table 7.

Figure 5:
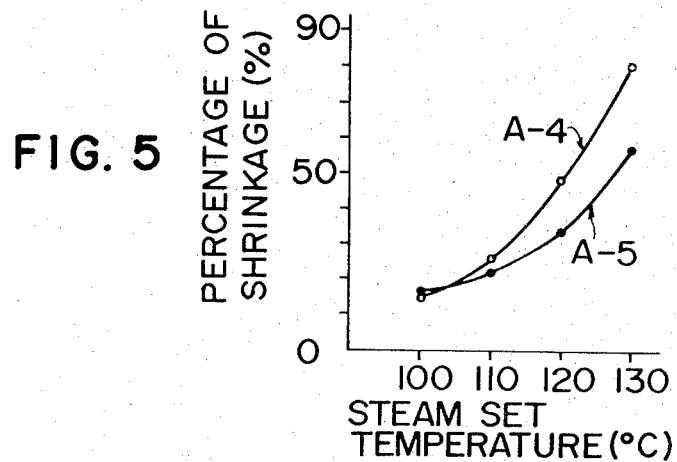
Figure 6:
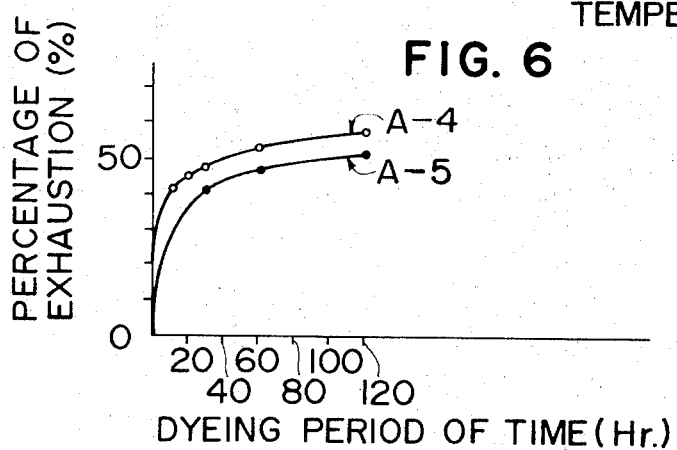

Properties of resultant fibers are shown in Table 12 and FIGS. 5 and 6.

FIG. 5 shows a graph in which the percentage of shrinkage of AN-VdCl-CVA-MA fibers are plotted against steam set temperatures. FIG. 6 shows a graph in which the dyeabilities (percentages of exhaustion) of AN-VdCl-CVP-MA fibers are plotted against dyeing periods of time.

Dyeing conditions for each run were as follows:

Fibers set at 110° C.
Ceblon Green B: 15% OWF
Emal 10: 2% OWF
Scourol 400: 1% OWF
Liquor ratio: 1:40
Temperature: 25° C.

TABLE 12
[Flameproof properties]

| Copolymer No. | Cl content (percent) | P content (percent) | Period of time of contact with flame (sec.) | Duration time of remaining flame (sec.) | Number of times of contact with flame |
|---|---|---|---|---|---|
| A-4 | 25.7 | 0.40 | 13.0 | 1.0 | 15 |
| A-5 | 24.5 | 0.33 | 10.0 | 2.7 | 13 |
| A-6 | 20.2 | 0.51 | 5.1 | 6.0 | 9 |

TABLE 10

| Copolymer No. | Composition of monomer charged (percent) AN | VdCl | CVP | MA | Analytical data of copolymer (percent) AN | VdCl | CVP | Percentage of polymerization | DM [1] | Minimum concentration of nitric acid capable of dissolving the copolymer (percent) [2] |
|---|---|---|---|---|---|---|---|---|---|---|
| A-4 | 65.0 | 28.0 | 5.0 | 2.0 | 59.0 | 34.0 | 3.0 | 74.5 | 1,320 | 73 |
| A-5 | 65.7 | 28.0 | 4.0 | 2.0 | 63.0 | 32.4 | 2.5 | 83.0 | 1,260 | 70 |
| A-6 | 66.7 | 26.0 | 4.0 | 3.0 | 65.8 | 26.0 | 3.8 | 82.0 | 1,100 | 67 |

[1] See footnote 1 at end of Table 6. [2] See footnote 1 at end of Table 1.

In all runs, 0.65% of KPS and 2.0% of SBS relative to the monomers, were used as a polymerization catalyst. Further sodium methallylsulfonate was not used in A-4 but it was used in A-5 and A-6 in an amount of 0.3% relative to the monomers.

In runs A-4 and A-5, three stainless impellers were used at 600 r.p.m. and in A-6, TK homomixer was used at 3000 r.p.m.

Resultant copolymers were subjected to spinning as in Example 1 and transparent fibers having superior lustre were obtained. Spinning conditions for each run are shown in Table 11.

From the foregoing data it has been confirmed that the fibers having the compositions of A-4 and A-5 have flameproof properties and at the same time properties not inferior to those of acrylonitrile polymer fibers. However, A-6 showed notable cohesion at the time of drying.

EXAMPLE 3

Monomers of AN, VdCl, CVP, MA and sodium allylsulfonate copolymer having compositions shown in following Table 13, were, respectively, copolymerized under following conditions: Monomer to water ratio, 1:4; catalyst, sodium hydroxylaminemonosulfonate (3.0%)- ammonium bisulfite (4.0%) redox type; suspension stabilizer, 0.2% polyvinyl alcohol (supplied from Kurare Co. with a trade name Poval #1500) (0.2%); sulfuric acid (0.16%); each percent being based on the monomers; pH, 2.5; polymerization temperature, 30° C.; mean retention time, 10 hours.

At first 0.2% aqueous solution of Poval #1500 and monomers were continuously charged in a 1 l. flask, each at the rate of 3.3 g./min., agitating the mixture vigorously to make the monomer to suspend sufficiently. Resultant monomer suspension, and each aqueous solution of sodium hydroxylaminemonosulfonate, ammonium bisulfite and sulfuric acid were continuously charged to 10 l., flask and polymerization was carried out while at the same time a polymer slurry was taken out from the other side of the flask. After filtration of the slurry, resultant polymers were washed with water, dehydrated and dried to obtain polymers. The results are shown in Table 13.

EXAMPLE 4

Monomers of AN, VdCl, CVP, acrylamide (AA) and sodium methallylsulfonate each having following compositions were copolymerized according to following conditions: monomer: water ratio 1:4; polymerization catalyst, sodium hydroxylamine monosulfonate (3.0%)-ammonium bisulfite (4.0%) redox catalyst; suspension stabilizer, Poval #1500 (0.2%); sulfuric acid (0.16%); each percent being based on monomers; pH, 2.5; polymerization temperature, 30° C.; mean retention time, 8 hours.

At first, an aqueous solution of Poval #1500 and monomers were continuously charged into a 500 ml. flask with vigorous stirring to give a suspension.

Resultant suspension of monomers, and each aqueous solution of sodium hydroxylamine monosulfonate, ammonium bisulfite and sulfuric acid were continuously charged to a 10 l. flask from an inlet to conduct polymerization while taking out from an outlet, polymer slurry which was filtered, washed with water, dehydrated and dried to give polymers indicated in Table 14.

These polymers were dissolved in purified 75% nitric acid cooled at 0° C. to give a spinning solution which was then extruded from a spinneret into 35% nitric acid coagulation bath maintained at 0° C. to effect coagulation. Resultant fibers were washed with water, stretched in a hot water at 90° C. and dried. Then the fibers were subjected to heat-treatment for 10 minutes in a saturated steam at 120° C. The fibers thus obtained showed superior dyeability, transparency and flameproof property (self-extinguishing property).

TABLE 13

| Copolymer No. | Composition of monomer charged [1] | | | | Polymer analysis | | | Percentage of polymerization (percent) | DM [2] | Minimum concentration of nitric acid capable of dissolving copolymer (percent) [3] |
|---|---|---|---|---|---|---|---|---|---|---|
| | AN | VdCl | CVP | MA | Acrylonitrile | Vinylidene chloride | CVP | | | |
| A-7 | 67.5 | 25 | 5 | 2.5 | 66.5 | 26.7 | 3.0 | 78 | 1,120 | 67 |
| A-8 | 64.0 | 28 | 5 | 2.5 | 61.7 | 29.3 | 2.9 | 76 | 1,200 | 71 |

[1] 0.5% sodium methallylsulfonate was included.
[2] See footnote 1 at end of Table 6.
[3] See footnote 1 at end of Table 1.

Resultant polymers were subjected to spinning as in Example 1 and transparent fibers having superior lustre were obtained.

Various spinning conditions are shown in Table 14.

TABLE 14

| Copolymer No. | Concentrations of nitric acid for spinning solution (percent) | Amount of copolymers charged (g.) [1] | Viscosities of spinning solution (poises) | Concentration of nitric acid for coagulation bath (percent) |
|---|---|---|---|---|
| A-7 | 70 | 31 | 940 | 38 |
| A-8 | 75 | 29 | 830 | 39 |

[1] See footnote 1 at end of Table 7.

TABLE 16

| Copolymer No. | AN | VdCl | CVP | AA | Sodium methallyl sulfonate | Period of time of contact with flame (sec.) | Duration time of remaining flame (sec.) | Number of times of contact with flame |
|---|---|---|---|---|---|---|---|---|
| A-9 | 62.0 | 30.5 | 2.5 | 4.5 | 0.5 | 4.9 | 2.0 | 14 |
| A-10 | 59.5 | 33.0 | 2.0 | 5.0 | 0.5 | 6.7 | 4.9 | 12 |

Test result of flameproof properties of resultant fibers are shown in Table 15.

TABLE 15

| Copolymer No. | Cl content (percent) | P content (percent) | Period of time of contact with flame (sec.) | Duration time of remaining flame (sec.) | Number of times of contact with flame |
|---|---|---|---|---|---|
| A-7 | 20.4 | 0.40 | 4.8 | 7.3 | 8 |
| A-8 | 22.3 | 0.39 | 7.0 | 3.4 | 11 |

Resultant fibers having compositions of A-7 and A-8 had superior flameproof properties as in Example 2 and properties not inferior to those of acrylonitrile synthetic fibers.

What is claimed is:
1. A modacrylic synthetic fiber comprising
   (a) at least 50% by weight acrylonitrile;
   (b) at least 25% by weight vinylidene chloride;
   (c) 0.1 to 3% by weight bis(2-chloroethyl)vinyl-phosphonate; and
   (d) at least one ethylenically unsaturated compound copolymerizable therewith.

2. A modacrylic synthetic fiber of claim 1, wherein said ethylenically unsaturated compound is acrylic acid, methacrylic acid, methyl acrylate ethyl acrylate, methyl methacrylate, acrylamide, methacrylamide or vinyl acetate.

3. Modacrylic synthetic fibers according to claim 1 wherein the content of vinylidene chloride is in the range of 25–40% (inclusive) by weight.

4. Modacrylic synthetic fibers according to claim 1 wherein said ethylenically unsaturated compound copolymerizable therewith is methyl acrylate.

5. Modacrylic synthetic fibers according to claim 1 wherein said ethylenically unsaturated compound copolymerizable therewith is ethyl acrylate.

6. Modacrylic synthetic fibers according to claim 1 wherein said ethylenically unsaturated compound copolymerizable therewith is acrylamide.

7. Modacrylic synthetic fibers according to claim 1 wherein said ethylenically unsaturated compound copolymerizable therewith is methacrylamide.

References Cited

UNITED STATES PATENTS 3,077,418   2/1963   Kenaga _____ 117—59

JOSEPH L. SCHOFER, Primary Examiner

C. A. HENDERSON, Jr., Assistant Examiner

U.S. Cl. X.R.

260—29.6 AN, 79.3 MU, DIG 24; 264—182